UNITED STATES PATENT OFFICE.

LUDWIG RISSMÜLLER, OF NEWARK, NEW JERSEY, AND HENRY VOLLBRECHT, OF NEW YORK, N. Y., ASSIGNORS TO THE NEWARK CHEMICAL WORKS, OF NEWARK, NEW JERSEY.

MANUFACTURE OF SUPERPHOSPHATES FROM KETTLE-RESIDUE.

SPECIFICATION forming part of Letters Patent No. 494,939, dated April 4, 1893.

Application filed September 24, 1891. Serial No. 406,701. (No specimens.)

*To all whom it may concern:*

Be it known that we, LUDWIG RISSMÜLLER, of Newark, New Jersey, and HENRY VOLLBRECHT, of the city and State of New York, have invented an Improvement in Utilizing the Kettle-Residue of Glue-Factories, of which the following is a specification.

The principal object of this invention is to extract from the so-called "kettle residue" of glue factories the fat which is the more valuable constituent thereof. Such residue is composed of varying proportions of skin, bones, hair, lime and both saponified and unsaponified fats, which are not convertible into a glue solution by boiling. It has heretofore been proposed to treat it with dilute sulphuric or muriatic acid for the destruction of the lime soap, and to subject it to a heat and pressure for squeezing the fat out of it. Such treatment is not effective unless there is a large proportion of hair present, and is quite impracticable when there is present any considerable quantity of lime soap, skin, or flesh particles which are not convertible into a glue solution by boiling. The said residue is hence commonly thrown aside as a waste product, but by the present invention it is made to yield, without the use of presses, a considerable proportion of fat and fat acids, and also a smaller proportion of nitrogenous superphosphates, which are commercially valuable commodities.

The present invention consists in submerging the said residue, hereinafter called the raw material, in a bath of warm sulphuric acid of about 50° Baumé, and in maintaining the said bath at a temperature of about 200° Fahrenheit. Under these conditions the acid not only destroys the lime soap but dissolves all the other organic components of the raw material such as hair, particles of skin, flesh, &c. The quantity of sulphuric acid varies according to the percentage of lime combinations in the raw material, and must be sufficient to dissolve them. Preferably an excess of acid is used. The sulphuric acid, previously warmed preferably to a temperature of 200° Fahrenheit, is placed in a lead tank in which the raw material is also placed. The mass is at once thoroughly stirred to carry the acid into contact with all parts of the raw material and make a thorough mixture.

At the commencement of the operation the contents of the tank are heated by the injection of steam directly into them. The bottom of the tank is also heated in any convenient manner, the object being to raise the contents of the tank to the temperature of, say 200° Fahrenheit as rapidly as may be, having reference to the proportion of carbonate of lime present, and so regulating the heating operation as to guard against the too rapid generation of carbonic acid and thereby prevent foaming. The steam is then shut off and the mass allowed to remain perfectly still. The gypsum which has been formed immediately begins to precipitate. By keeping the bottom of the tank hot, any fat which have been imprisoned in or precipitated with the gypsum is set free and rises to the surface. The concentrated acid ultimately dissolves all the nitrogenous substances present, and during the formation of the acid solution the fat which is set free rises to the surface, from which it is skimmed off and thus separately collected for commercial disposal. As before stated, the gypsum is precipitated upon the bottom of the tank. The solution is then drawn off from the tank and evaporated, to drive off the larger part of the water which is present, leaving in the solution sulphuric acid, phosphoric acid, and nitrogen. In this condition the solution is a merchantable commodity, and can be sold to manufacturers of fertilizers at a price based upon the quantities of acid and nitrogen contained in it. Or it can be immediately manufactured into fertilizers, in which case there is mixed with it a sufficient quantity of any powdered phosphate, such as phosphate of lime, to take up the free sulphuric acid present, which free acid renders the phosphoric acid of the added phosphate soluble. The resulting product is a comparatively dry fertilizer in condition for use.

What is claimed as the invention is—

1. The herein-described treatment of the kettle residue of glue factories for the extraction of the fat therefrom, which consists in mixing such residue with warm sulphuric acid of a density of about 50° Baumé in a suitable vessel, and heating the resulting mixture to a temperature of about 200° Fahrenheit, and in allowing said heated mixture to remain undisturbed until the nitrogenous substances have entered into solution with the acid, the gypsum has been precipitated, and the fat has risen to the surface, and in then skimming off said fat and separately collecting it for commercial disposal.

2. The herein-described process of utilizing the kettle residue of glue factories, which consists in mixing such residue with warm sulphuric acid of a density of about 50° Baumé in a suitable vessel, and in heating the resulting mixture at a temperature of about 200° Fahrenheit, and in allowing said heated mixture to remain undisturbed until the nitrogenous substances present have entered into solution with the acid; the gypsum has been precipitated and the fat has risen to the surface, and in then separately collecting the said solution for commercial disposal.

3. The herein-described process of manufacturing fertilizers from the kettle residue of glue factories, which consists in mixing such residue with warm sulphuric acid of a density of about 50° Baumé in a suitable vessel, and in heating the resulting mixture at a temperature of about 200° Fahrenheit, and in allowing said heated mixture to remain undisturbed until the nitrogenous substances present have entered into solution with the acid, the gypsum has been precipitated and the fat has risen to the surface, and in then separately collecting the said solution, and adding to it a powdered phosphate, such as phosphate of lime, in sufficient quantity to take up all the sulphuric acid present, thus rendering soluble the phosphoric acid of the added phosphate and yielding a comparatively dry product in condition for use as a fertilizer.

L. RISSMÜLLER.
H. VOLLBRECHT.

Witnesses:
M. L. ADAMS,
A. M. JONES.